(12) United States Patent
Zollner

(10) Patent No.: US 8,775,016 B2
(45) Date of Patent: Jul. 8, 2014

(54) METHOD FOR OPERATING A MOTOR VEHICLE AND A CONTROL DEVICE FOR SAID VEHICLE

(71) Applicant: ZF Friedrichshafen AG, Friedrichshafen (DE)

(72) Inventor: Tobias Zollner, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 17 days.

(21) Appl. No.: 13/762,576

(22) Filed: Feb. 8, 2013

(65) Prior Publication Data
US 2013/0225366 A1 Aug. 29, 2013

(30) Foreign Application Priority Data

Feb. 27, 2012 (DE) .......................... 10 2012 202 905

(51) Int. Cl.
| | |
|---|---|
| *G01M 17/00* | (2006.01) |
| *B60W 10/02* | (2006.01) |
| *B60W 10/11* | (2012.01) |
| *F16H 61/00* | (2006.01) |
| *B60K 6/48* | (2007.10) |

(52) U.S. Cl.
CPC .............. *B60W 10/11* (2013.01); *B60W 10/023* (2013.01); *Y02T 10/6252* (2013.01); *B60K 2006/4825* (2013.01); *Y02T 10/6286* (2013.01); *F16H 61/0031* (2013.01); *Y10S 477/906* (2013.01)
USPC .......................................... 701/32.8; 477/906

(58) Field of Classification Search
USPC .......................................... 475/119; 477/906
See application file for complete search history.

(56) References Cited

U.S. PATENT DOCUMENTS

| | | | |
|---|---|---|---|
| 8,055,401 B2 * | 11/2011 | Aldrich et al. ................ 701/33.9 |
| 8,116,932 B2 * | 2/2012 | Aldrich et al. ................ 701/31.8 |
| 8,467,947 B2 * | 6/2013 | Zollner et al. .................... 701/66 |
| 8,543,279 B2 * | 9/2013 | Mundy et al. ................. 701/29.1 |
| 2011/0120568 A1 | 5/2011 | Borntraeger et al. | |

FOREIGN PATENT DOCUMENTS

| | | |
|---|---|---|
| DE | 10 2008 040 667 A1 | 1/2010 |
| DE | 10 2010 008 465 A1 | 10/2010 |

OTHER PUBLICATIONS

German Search Report Corresponding to DE 10 2012 202 905.2.

* cited by examiner

*Primary Examiner* — Dirk Wright
(74) *Attorney, Agent, or Firm* — Davis & Bujold, PLLC; Michael J. Bujold

(57) ABSTRACT

A method of operating a motor vehicle having a drive aggregate, a transmission and a hydraulic system. The transmission has shift elements and, for each gear, only a portion of the elements are engaged while a remainder are disengaged. The hydraulic system has main pump driven by the drive aggregate and an auxiliary pump. The method tests the functionality of the auxiliary pump. The drive aggregate and the main pump are insufficiently driven such that the shift elements can not engage. The auxiliary pump is driven to provide required pressure such that all but one of the shift elements fully engages. The remaining shift element is then first engaged up to its engagement point and then either engaged beyond its engagement point or another unengaged shift element is engaged beyond its engagement point. The functionality of the auxiliary pump is determined based on changes in the drive aggregate's rotational speed.

9 Claims, 1 Drawing Sheet

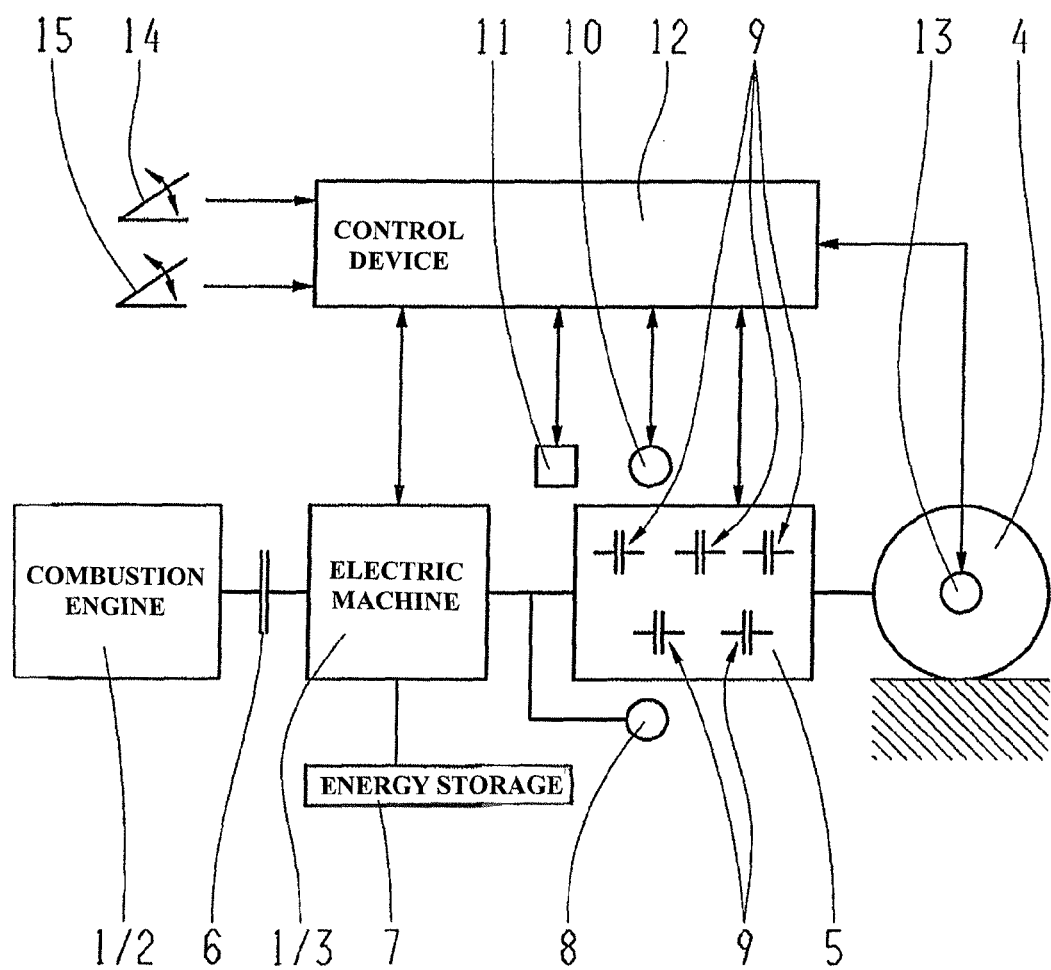

METHOD FOR OPERATING A MOTOR VEHICLE AND A CONTROL DEVICE FOR SAID VEHICLE

This application claims priority from German patent application serial no. 10 2012 202 905.2 filed Feb. 27, 2012.

FIELD OF THE INVENTION

The invention concerns a method for operating a motor vehicle. In addition, the invention concerns a control device of a motor vehicle.

BACKGROUND OF THE INVENTION

FIG. 1 shows a very schematic, known in the industry, exemplary drive train of a motor vehicle which is designed as a hybrid vehicle, whereby such a hybrid vehicle comprises a drive aggregate 1, designed as hybrid drive, which is formed having a combustion engine 2 and an electric machine 3. A transmission 5 is positioned between the drive aggregate 1 and an output 4. The transmission 5 represents here an especially automatic or automated shift transmission. The transmission 5 comprises of an amount N of shift elements 9, wherein FIG. 1 shows five shift elements 9. A first defined partial amount M of the shift elements 9 is engaged in each gear and a second defined partial amount N-M of the shift elements 9 are disengaged. Thus, it can be provided in FIG. 1 that in each engaged gear three of the 5 shift elements 9 are engaged and two of the five shift elements 9 are disengaged.

FIG. 1 also shows a clutch 6 provided between the combustion engine 2 and the electric machine 3 of the drive aggregate 1, wherein the combustion engine 2 is decoupled from the output 4 when the clutch 6 is disengaged and is then shutdown so as to operate the hybrid vehicle, in electric mode, exclusively by the electric machine 3 of the drive aggregate. To the contrary, when the clutch 6 is engaged, the combustion engine 2 is coupled to the output 4 and the hybrid vehicle can be driven by the combustion engine 2 as well as by the electric machine 3 or rather by both simultaneously.

An electric energy storage 7 operates together with the electric machine 3, in accordance with FIG. 1, which in the motor operation of the electric machine 3 of the drive aggregate 1 is more discharged, and in generator operation of the electric machine 3 of the drive aggregate 1 is more charged. A brake 13, in accordance with FIG. 1, operates together with the output 4.

The drive train of FIG. 1 has in addition a hydraulic system which comprises a main pump 8 which, beginning with the drive aggregate 1, can be mechanically driven. At the time when, for instance, during electric drive at low speed with a disengaged clutch 6, the rotational speed of the electric machine 3 of the drive aggregate 1, which drives the main pump 8, is too low, it is possible that the main pump 8 cannot respond to a hydraulic pressure request. It is already known in practice for the hydraulic system of the motor vehicle, in addition to the main pump 8, to be driven by an electric auxiliary pump 10, independent from the drive aggregate 1, by a separate electric motor 11 of the auxiliary pump 10.

FIG. 1 also shows a control device 12 which exchanges data with the transmission 5 and the electric motor 11 of the auxiliary pump 10, as illustrated by double-arrows, for controlling and/or adjusting the operation of the electric machine 3. In addition, the control device 12 exchanges data with the brake 13, an accelerator pedal 14, and a brake pedal 15 of the motor vehicle. The control device 12 can be a hybrid control device in a hybrid vehicle or also a transmission control device.

To monitor the auxiliary pump 10 and to guarantee functioning of the auxiliary pump 10, in motor vehicles known in the practice, a pressure sensor is installed in the transmission 5 to test the level of hydraulic pressure provided by the auxiliary pump 10. Such a pressure sensor requires installation space and causes additional cost.

DE 10 2008 040 667 A1 teaches a hydraulic system of a motor vehicle with a main pump and an auxiliary pump, as well as details a method for operating this hydraulic pressure system.

There is a requirement for a method for operating a motor vehicle and a control device for a motor vehicle, through which a pressure sensor for the functional test of the auxiliary pump of the hydraulic system can be omitted.

SUMMARY OF THE INVENTION

Based on the above, an object of the present invention is to disclose a novel method for operating a motor vehicle, as well as a novel control device.

In accordance with the invention and for the functional test of the auxiliary pump when the motor vehicle is at stand still and with an activated brake, the drive aggregate is operated with a rotational speed which is so low that the main pump cannot provide a sufficient hydraulic pressure to fill the shift elements of the transmission, where to the contrary, the auxiliary pump is driven to provide the needed hydraulic pressure wherein, for a defined gear the respective shift elements, except for one, which need to be engaged are completely engaged for the defined gear and the remaining shift element gets engaged until the engagement point is reached, thereafter either the remaining shift element gets engaged beyond the engagement point or another shift element, which does not need to be engaged for the defined gear and is in a completely disengaged condition, gets then engaged beyond the engagement point, wherein at the time when a reduction of the rotational speed of the drive aggregate is noticed, it is concluded that the auxiliary pump is properly functioning, but if no reduction of the rotational speed of the drive aggregate is noticed, it is concluded that the function of the auxiliary pump is not adequate. Because of this invention, a pressure sensor for testing the functionality of the auxiliary pump can be eliminated.

In an advantageous further embodiment, when utilizing a shift element which does not have to be engaged for a defined gear, beginning at a completely disengaged condition, it is engaged beyond the engagement point and through the time duration between the start of the engagement of the respective disengage shift element, and the start of the reduction of the rotational speed of the drive aggregate, the amount of hydraulic pressure which has to be provided by the auxiliary pump is calculated. This advantageous further embodiment can calculate the required hydraulic pressure of the auxiliary pump without a pressure sensor.

Preferably, the brake is activated throughout the entire functional test of the auxiliary pump and therefore the drive train of the motor vehicle is blocked by the brake. Thus, a crawl start or starting, respectively, of the motor vehicle is prevented during the functional test of the auxiliary pump and therefore, the functional safety is increased.

In an advantageous further embodiment, an electric machine of a hybrid drive or an electric drive as the drive aggregate are operated with a rotational speed which is so low that the main pump cannot provide a sufficient hydraulic pressure for filling the shift elements of the transmission, wherein also from the following, recognized or not recognized, reduction of the rotational speed of the electric machine, a proper functioning or improper functioning of the auxiliary pump is concluded. The invention is especially advantageously applied in a hybrid vehicle or a pure electric vehicle.

BRIEF DESCRIPTION OF THE DRAWINGS

The embodiment examples of the invention are, without being limited to it, further explained based on the sole drawing. It shows an exemplary schematic of a motor vehicle design as a hybrid vehicle, to which the invented method to operate a motor vehicle can be applied to.

DETAILED DESCRIPTION OF THE PREFERRED EMBODIMENTS

The invention concerns a method for operating a motor vehicle as well as a control device of a motor vehicle for the execution of the method.

FIG. 1 shows a drive train schematic of a motor vehicle which is designed as a hybrid vehicle to which the inventive method, as well as the inventive control device 12 can be applied. See the above description in regard to FIG. 1.

It needs to be mentioned, however, at this point that the invention is not limited to the drive train configuration as in FIG. 1. The inventive method and the inventive control device can also be applied to of the drive train configurations, for instance in an electric vehicle in which the drive aggregate does not comprise of a combustion engine, but exclusively at least an electric machine.

The present invention concerns only such details through which, without the necessity of a pressure sensor in the transmission 5, monitoring of functionality of the electrically driven auxiliary pump 10 can be guaranteed. As already stated, the electrically driven auxiliary pump 10 is then used to provide a hydraulic pressure for a hydraulic pressure requirement, if the main pump 8, for example as a result of too low a speed of the driving unit 1 can not provide sufficient hydraulic pressure.

The functionality check of the auxiliary pump 10 is exclusively executed when the motor vehicle is at stand still and the brake 13 is activated. Thus, the drive train is blocked by the brake 13 so that, during the functionality test of the auxiliary pump 10, the motor vehicle cannot move. In the initial state of the functionality test, meaning when the motor vehicle is at stand still and the brake 13 is activated, the drive aggregate 1 is turned off, the rotational speed of the electric machine 3 of the drive aggregate 1 as in FIG. 1 is therefore zero.

In this state of the drive aggregate, in which the main pump 8 cannot provide a sufficient hydraulic pressure for the filling of the shift elements 3, the auxiliary pump 10 is triggered by the control device 12 in a way that it shall provide a sufficient hydraulic pressure for the filling of the shift elements 9 of the transmission 2. Hereby, the shift elements 9 of the transmission 5 are filled in a way or rather engaged for a defined gear, namely for a starting gear of the transmission 5, the respective shift elements 9 which have to be engaged, except for one for the defined gear of the shift elements 9, are completely engaged and the remaining shift element which then forms a starting element is engaged to its engagement point.

In the variation of FIG. 1, in which, in each engaged gear, three shift elements are engaged and two shift elements are disengaged, two shift elements are hereby completely engaged when the invented method is executed. A shift element, which is provided as the starting element for the respective starting gear, is exclusively engaged up to its engagement point.

Further, in parallel with or subsequently to this, the rotational speed at the drive aggregate 1, meaning in FIG. 1 at the electric machine 3, is lowered so that the main pump 8 cannot provide sufficient hydraulic pressure for the filling the shift elements 9 of the transmission 5, the rotational speed is, however, larger than zero.

In a first variation of the invention, the remaining shift element, which is already engaged up to the engagement point, is hereafter further engaged beyond the engagement point, particularly it is slowly closed by the control device 12 by means of a ramping pressure and therefore it is slowly engaged, wherein when, in this case, at the rotational speed of the drive aggregate 1, meaning in FIG. 1 at the rotational speed of the electric machine 3, a reduction of the rotational speed, thus a rotational speed reduction is noticed, it is concluded that the auxiliary pump is functioning properly. To the contrary, when no reduction of the rotational speed of the drive aggregate 1, meaning no rotational speed reduction at the electric machine 3 is noticed, it is concluded that the auxiliary pump 10 is functioning improperly.

By means of the engagement of the remaining shift elements 9 of the transmission 5 beyond their engagement point, a force-fit connection condition is provided in the transmission 5, against which the electric machine 3 of the drive aggregate 1 has to work, so that the rotational speed reduction is effective at the electric machine 3. The rotational speed reduction at the electric machine 3 is only created when the respective shift elements 9 for the starting gear can be engaged by means of the auxiliary pump 10, so that hereby it can be concluded that the auxiliary pump 10 is functioning properly.

In an additional variation of the invention, the functionality test of the auxiliary pump 10 is performed when for a defined gear the respective shift elements 9 of the transmission 5 which need to be engaged, except for one, are completely engaged and the remaining shift element 9 is engaged up to the engagement point and when the drive aggregate 1 is operated with such a low rotational speed that the main pump 8 cannot provide sufficient enough pressure for the remaining shift element of the respective defined gear to be engaged beyond the engagement point, but instead another shift element, which does not need to be engaged for the defined gear, starting from a completely disengaged condition is filled and engaged beyond the engagement point.

At that time when a reduction of the rotational speed of the drive aggregate is noticed, namely the electric machine 3 of the drive aggregate 1, it is concluded that the auxiliary pump 10 is functioning properly, but at that time when no reduction of the rotational speed of the drive aggregate 1 is noticed, it is concluded that the auxiliary pump 10 is functioning properly.

It is also possible with this variation to determine the amount of the hydraulic pressure provided by the auxiliary pump 10, based on the time which passes between the engagement of the respective shift element 9 of the transmission 5, beginning from the completely disengaged condition and going beyond the engagement point and the reduction of the rotational speed at the drive aggregate 1, namely the electric machine 3. From the duration of time needed for the engagement of the respective shift elements, starting from a completely disengaged condition to beyond the engagement point, the amount of hydraulic pressure which is provided by the auxiliary pump 10 can be concluded, for instance based on a stored characteristics diagram in the control device 12.

As already mentioned, during the entire method the brake 13 which acts on the output 4 is actuated. Thus, the inventive method can be executed in an automatic transmission when the transmission selection lever is moved to the selection lever position D (drive) for forward drive and at the same time the brake pedal 15 is actuated by the driver.

Also, the inventive method can be executed at the time when the transmission selector lever of the transmission 5 is engaged in the selector level position P (Park), wherein in this case the brake 13 is not activated since the park lock is engaged and therefore the output is blocked.

FIG. 1 represents as the drive aggregate 1, a hybrid drive with a combustion engine 1 and an electric machine 3. The invention can also be applied in electric drives which do not have combustion engines.

The inventive method as well as the inventive control device for executing the method enable testing the functionality of the auxiliary pump 10 of a hydraulic system of a motor vehicle without a separate pressure sensor in transmission 5. It is hereby possible to save construction space and the additional cost of the pressure sensor.

REFERENCE CHARACTERS

1 Drive Aggregate
2 Combustion Engine
3 Electric Machine
4 Output
5 Transmission
6 Clutch
7 Electric Energy Storage
8 Main Pump
9 Shift Elements
10 Auxiliary Pump
11 Electric Machine
12 Control Device
13 Brake
14 Drive Pedal
15 Brake Pedal

The invention claimed is:

1. A method of operating of a motor vehicle comprising a drive aggregate (1), a transmission (5) and a hydraulic system, the transmission (5) comprising a number (N) of shift elements (9) which, for each engaged gear, a first required partial amount (M) of the shift elements are engaged while an unrequired second partial amount (N-M) of the shift elements remain disengaged, the hydraulic system comprising a main pump (8) being driven by the drive aggregate (1) of the motor vehicle, and an auxiliary pump (10), being drivable independently from the drive aggregate (1), the method comprising the steps of:

testing, when the motor vehicle is at a standstill and a brake (13) is activated, a functionality of the auxiliary pump (10);

operating the drive aggregate (1) at a rotation speed which is low enough that the main pump (8) cannot provide a hydraulic pressure for filling of the shift elements (9) of the transmission (5), but driving the auxiliary pump (10) to provide a required hydraulic pressure, for a defined gear, to completely engage all but one shift element of the first partial amount (M) of the shift elements required for the defined gear, and engaging the all but one shift element up to an engagement point;

subsequently either engaging the all but one shift element, beyond the engagement point, or engaging at least one other shift element, of the second partial amount (N-M) of the shift elements which are not engaged for the defined gear, starting from a completely disengaged condition to a condition beyond its engagement point; and upon noticing a reduction of the rotational speed of the drive aggregate (1), concluding that the auxiliary pump (10) is functioning properly, but, in an event that no reduction of the rotational speed of the drive aggregate (1) is noticed, then concluding that the auxiliary pump (10) is improperly functioning.

2. The method according to claim 1, further comprising the step of, at the time when the at least one other shift element, of the second partial amount (N-M) of the shift elements which are not engaged for the defined gear, becomes engaged beyond the engagement point, determining an amount of the hydraulic pressure, provided by the auxiliary pump (10), from a time duration between at a beginning of the engagement of the at least one other shift element and a beginning of the reduction of the rotational speed of the drive aggregate.

3. The method according to claim 1, further comprising the step of operating an electric machine (3) of a hybrid drive or an electric drive that is operated as the drive aggregate (1) at a rotational speed which is low enough that the main pump (8) cannot provide a sufficient hydraulic pressure for the filling of the shift elements of the transmission.

4. The method according to claim 1, further comprising the step of activating the brake (13), during an entire functional test of the auxiliary pump (10), such that a drive train of the motor vehicle is blocked.

5. A control device (12) for a motor vehicle comprising a drive train, a transmission and a hydraulic system, the control device (12) independently performing a functional test with the drive aggregate (1) and an auxiliary pump (10) of the hydraulic system when the motor vehicle is at stand still and a brake (13) is activated;

the control device (12) actuating the drive aggregate (1) in such a way that the drive aggregate (1) operates at a rotational speed which is low enough that a main pump (8) of the hydraulic system, which is driven by the drive aggregate (1), cannot provide a sufficient hydraulic pressure for the filling of the shift elements (9) of the transmission (5), and the control device (12) also actuating the auxiliary pump (10) to provide a required hydraulic pressure for the shift elements (9);

the control device (12) completely engaging all but one shift element, of the shift elements of the transmission (5) which are required to be engaged for achieving a defined gear, while a remainder of the shift elements, not require for engagement the defined gear, are disengaged, and engaging the all but one shift element up to an engagement point thereof;

the control device (12) thereafter either actuating the all but one shift element beyond the engagement point thereof or actuating at least one other shift element of the remainder of the shift elements, not require for engagement the defined gear, starting at a completely disengaged condition to a point beyond an engagement point of the least one other of the remainder of the shift elements; and the control device (12), at the time when a reduction of the rotational speed of the drive aggregate (1) is noticed, concluding that the auxiliary pump (10) is functioning properly, but the control device (12), if no reduction of the rotational speed of the drive aggregate (1) is noticed, concluding that the auxiliary pump (10) is functioning improperly.

6. The control device (12) according to claim 5, wherein the control device (12), during an entirety of the functional test of the auxiliary pump (10), activates the brake (13) and so as to block the drive train of the motor vehicle.

7. The control device (12) according to claim 5, wherein the control device (12) calculates, starting at the time when the at least one other shift element (9), which does not have to be engaged for the defined gear, is a completely disengaged condition to point beyond the engagement point, a hydraulic pressure provided by the auxiliary pump (10) from a time duration which occurs between engagement of the at least one other shift element (9) and a reduction of the rotational speed of the drive aggregate.

8. The control device (12) according to claim 5, wherein the control device (12) actuates, the drive aggregate (1) and the electric machine (3) of the hybrid drive or an electric drive such that the electric machine (3) is driven at a rotational speed which is low enough that the main pump (8) cannot provide sufficient hydraulic pressure for the filling of the shift elements (9) of the transmission (5).

9. A method of operating of a motor vehicle for testing a functionality of an auxiliary pump of a hydraulic system, the motor vehicle comprising a drive aggregate (1), a transmission (5) and the hydraulic system which further comprising a main pump (8), the transmission (5) comprises a plurality (N) of shift elements (9), selective engagement of each of the plurality (N) of shift elements (9) facilitates engagement of desired transmission gears, for each of the transmission gears a respective first portion of the respective shift elements is engaged and a respective second portion of the respective shift element is disengaged, the main pump of the hydraulic system being connected to and driven by the drive aggregate and the auxiliary pump being drivable independently of the drive aggregate, the method comprising the steps of:

initiating testing of the functionality of the auxiliary pump (10) when a brake (13) is actuated and the motor vehicle is stationary;

driving the drive aggregate at a rotational speed such that the main pump is unable to provide a required amount of hydraulic pressure to the first portion of shift elements to engage the first portion of the shift elements require for the engagement of a desired transmission gear;

driving the auxiliary pump (10) to provide the required amount of hydraulic pressure to the first portion of the shift elements to engage fully all of the shift elements, except one shift element, required for engagement of the desired transmission gear, and only engaging the except one shifting element up to an engagement point;

subsequently engaging either the except one shifting element beyond an engagement point thereof or engaging another shift element, which is not required for engagement of the desired transmission gear, starting from a completely disengaged condition to a condition beyond engagement of the another shift element;

monitoring the rotational speed of the drive aggregate;

concluding that the auxiliary pump is functioning properly if a reduction of the rotation speed of the drive aggregate is detected during subsequently engagement of either the except one shifting element or the another shift element; and concluding that the auxiliary pump is improperly functioning if a no reduction of the rotation speed of the drive aggregate is detected during subsequently engagement of either the except one shifting element or the another shift element.

* * * * *